Dec. 6, 1949   J. OSTRAK   2,490,317
ELECTRICAL CONNECTOR
Filed Oct. 23, 1946
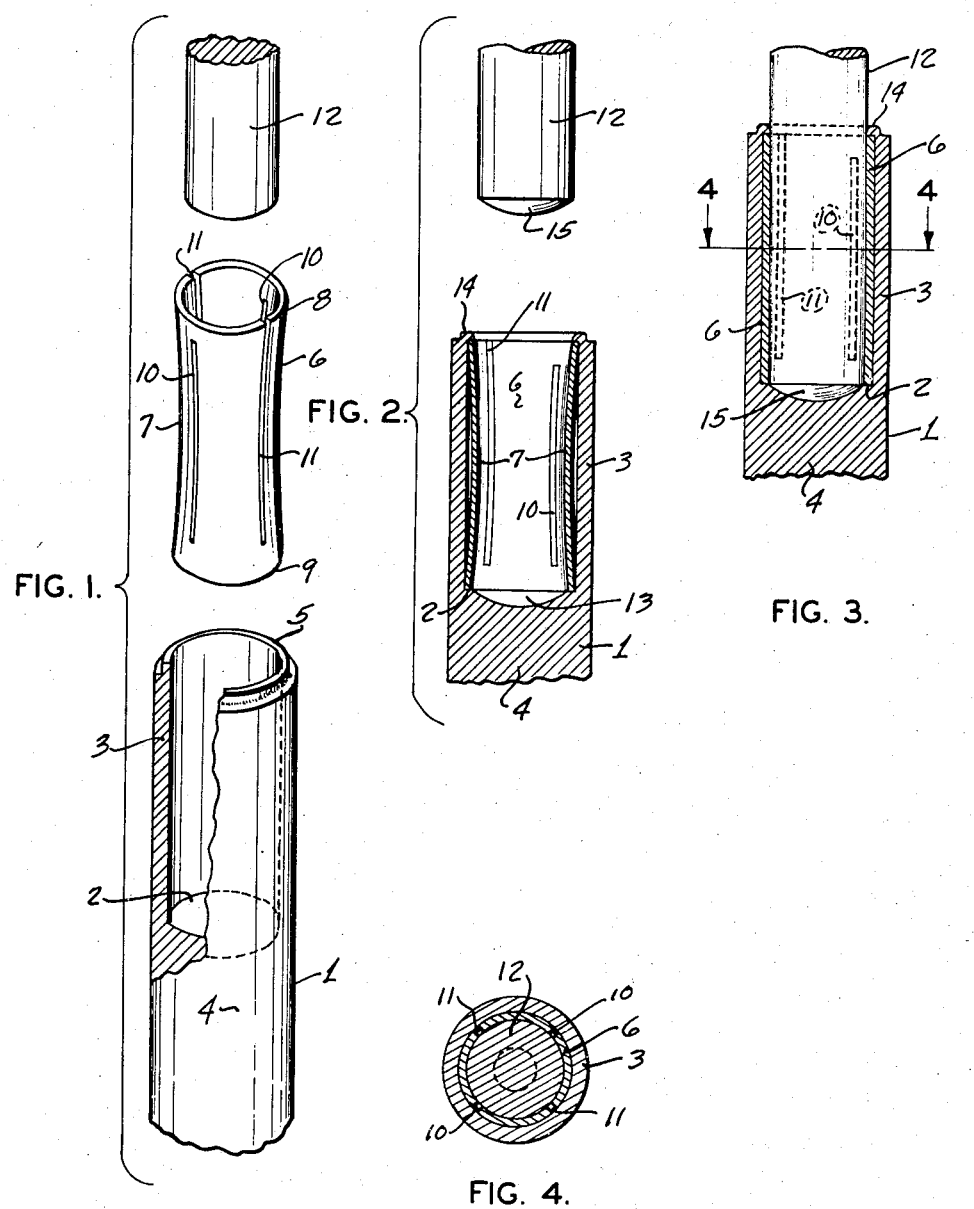
INVENTOR
JOSEPH OSTRAK
By Howard G. Cook
ATTORNEY Patented Dec. 6, 1949

2,490,317

UNITED STATES PATENT OFFICE 2,490,317

ELECTRICAL CONNECTOR

Joseph Ostrak, St. Louis, Mo.

Application October 23, 1946, Serial No. 705,020

1 Claim. (Cl. 173—363)

This invention relates to electrical connectors, and while it may be used to connect any two suitable objects, it is intended for use particularly where a plurality of extensions is to be connected one to another for the purpose of providing a connecton of sufficient length between objects which are spaced a considerable distance from each other.

One of the advantages of my connector is that it permits such extremely tight engagement between the parts to be connected by peening the outer cylinder over the inner casing that it is practically proof against the accidental disengagement which frequently occurs when connectors as heretofore produced are used. Another advantage is the simplicity of its component parts, which permits it to be quickly and cheaply produced, and also it is not as likely to get out of order as the ordinary electrical connector.

In the drawings—

Fig. 1 is an exploded perspective view of my connector, partly broken away.

Fig. 2 is a longitudinal, cross-sectional view of the connector as it appears when in position to receive the plug.

Fig. 3 is an elevational view of the connector and plug in assembly.

Fig. 4 is a cross-sectional view taken on the line 4—4, Fig. 3.

The invention comprises a cylinder 1 hollowed out from one of its ends to a point 2 some distance from said end to provide a tubular shell having a cylindrical wall 3, thus leaving a solid portion 4 at the opposite end of the cylinder 1. At its free end the wall 3 is cut away a slight distance to form a small extension 5 at its inner circumference. The cylinder 1 is formed of any material suitable for conducting electric current, and its lower portion 4 is provided with any suitable means for the reception of electrical wires (not shown).

I provide a casing 6 which is adapted to be inserted into the tubular shell of the cylinder 1. The casing 6 is of generally tubular formation, but its wall is bulged in so that its smallest diameter is at its center portion, as shown at 7, while its diameter at its ends 8 and 9 is such as to permit said ends to fit snugly within the tubular shell. The wall of the casing has two pairs of diametrically opposed, longitudinal slots 10 and 11. The slots 10 extend to a point slightly short of the extremities of the casing 6, while the slots 11 terminate at one of their ends a slight distance short of the end 9 of the casing and at their opposite ends they extend to the end 10 thereof, as most clearly illustrated in Fig. 1. The casing 6 is formed of any suitable resilient material having electrical conductivity, and the slots 10 and 11 permit expansion of the casing upon the application of pressure from within. A plug 12 of approximately the diameter of the ends of the casing 6 is provided for insertion into said casing.

In Fig. 2 I have illustrated the device as it appears when the casing has been positioned within the shell portion of the cylinder 1. It will be noted that the casing 6 is of approximately the same length as the walls of the shell, and that said shell portion is rounded out below the point 2, so that when the casing 6 is pushed all the way into said shell portion the upper edge of the casing extends to the point where the wall 3 has been cut away to form the extension 5, while the opposite end of the casing comes to rest within the cylinder at the point 2, thus leaving a small space 13 between the solid portion 4 of the cylinder 1 and the lower end of the casing 6. The extension 5 is peened over the free end of the casing as shown in 14 which has the effect of securing the casing 6 within the shell portion of the cylinder 1. With the parts in the position just described, it will be observed from Fig. 2 that at the middle portion 7 of the casing 6 it is spaced a slight distance away from the wall 3 of the shell.

In operation the procedure is as follows:

Suppose the plug 12 is attached to an extension (not shown) which is to be connected to another extension, to which the cylinder 1 is attached through electrical wires (not shown). The plug 12 is, of course, formed of a suitable conducting material and is rounded at its free end, as shown at 15. The plug is pushed down into the casing 6 until its rounded end 15 extends into the space 13 and the plug is seated at the point 2. The diameter of the plug is constant throughout its length, and since this diameter is the same as that of the ends 8 and 9 of the casing, it is obvious that the diameter of the plug 12 is greater than that of the casing 6 at its middle portion 7. It follows that as the plug 12 is pushed down into the casing 6 it applies pressure to the casing at its narrow portion, and the slots 10 and 11 permit the casing to expand until it assumes the shape shown in Fig. 3, where it will be noted that its diameter has become uniform and it is in tight gripping engagement with the plug 12 throughout its length. The wall of the casing 6 at the same time has been expanded until it contacts the wall 3 of the shell portion throughout the length of the casing. The assembly is now in the position shown in Fig. 3, with the plug 12, casing 6, and wall 3 respectively contacting each other throughout their length, and with the rounded end 15 of the plug in contact with the solid portion 4 of the cylinder 1, through which electrical energy is conducted to the wires (not shown). The engagement of the parts as above described prevents accidental disengagement thereof.

I claim:

An electrical connector socket device adapted to receive and hold a plug; comprising an outer member having a cylindrical opening extending inwardly a predetermined distance and terminating at its inner end in a shoulder; a casing sleeve of resilient material, of substantially cylindrical shape, of a length slightly less than the depth of the opening, and having its ends of substantially the diameter of the opening and its midportion between its ends bowed inwardly the sleeve being disposed in the cylindrical opening with its inner end engaging the shoulder, and said outer member being flanged over the outer end of said casing sleeve, whereby said casing sleeve is held at its opposite ends between the shoulder and said flange; the flange extending inwardly toward the center of the opening no further than the inner diameter of the adjacent end of the sleeve, the sleeve between its ends being slit along said inwardly bowed portion, whereby said bowed portion is yieldable outwardly responsive to insertion of a plug of substantially the diameter of the inner diameter of the casing sleeve at its ends.

JOSEPH OSTRAK.

REFERENCES CITED

The following references are of record in the file of this patent:

UNITED STATES PATENTS

| Number | Name | Date |
|---|---|---|
| 1,871,839 | Carter | Aug. 16, 1932 |
| 2,317,023 | Bird | Apr. 20, 1943 |
| 2,394,020 | Soreny | Feb. 5, 1946 |

FOREIGN PATENTS

| Number | Country | Date |
|---|---|---|
| 317,343 | Germany | June 7, 1917 |
| 192,521 | Great Britain | Feb. 8, 1923 |
| 137,963 | Switzerland | Apr. 16, 1930 |
| 151,479 | Switzerland | Mar. 1, 1932 |
| 855,711 | France | May 18, 1940 |